United States Patent
Song et al.

(10) Patent No.: US 7,464,389 B2
(45) Date of Patent: *Dec. 9, 2008

(54) OPTICAL PICKUP ACTUATOR WITH A MAGNETIC DRIVER HAVING FOCUS, TRACK AND TILT COILS

(75) Inventors: Byung-youn Song, Gyeonggi-do (KR); Do-sun Nam, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/638,587

(22) Filed: Dec. 14, 2006

(65) Prior Publication Data

US 2007/0091740 A1    Apr. 26, 2007

Related U.S. Application Data

(63) Continuation of application No. 10/173,979, filed on Jun. 19, 2002, now Pat. No. 7,210,154.

(30) Foreign Application Priority Data

Jun. 19, 2001    (KR)    ................................ 2001-34686

(51) Int. Cl.
G11B 7/08    (2006.01)

(52) U.S. Cl. ..................................... 720/681

(58) Field of Classification Search ........................ None
See application file for complete search history.

(56) References Cited

U.S. PATENT DOCUMENTS

| | | | |
|---|---|---|---|
| 4,911,534 A | * | 3/1990 | Beyersbergen van Henegouwen et al. .............................. 359/824 |
| 5,208,703 A | | 5/1993 | Ikegame et al. |
| 5,663,840 A | | 9/1997 | Matsui |
| 6,295,255 B1 | | 9/2001 | Seo et al. |
| 6,580,569 B2 | | 6/2003 | Choi et al. |

(Continued)

FOREIGN PATENT DOCUMENTS

JP    08-273176    10/1996

(Continued)

*Primary Examiner*—David D Davis
(74) *Attorney, Agent, or Firm*—Staas & Halsey LLP

(57) ABSTRACT

An optical pickup actuator includes focus coils, track coils, and tilt coils disposed on opposite sides of a bobbin to drive the bobbin in a focus direction, a track direction, and a tilt direction and leaves the other opposite sides of the bobbin as empty sides on which the focus, track, and tilt coils are not disposed. The optical pickup actuator includes a base, a bobbin, a holder, and a magnetic driver. The bobbin is movably disposed on the base since supporting units support the bobbin above the base. The holder is disposed on one side of the base and connected to one ends of the supporting units. The magnetic driver has the focus coils driving the bobbin in the focus direction, the track coils driving the bobbin in the track direction, the tilt coils driving the bobbin in a tilt direction, and magnets installed to face the focus coils, the track coils, and the tilt coils. Since the other opposite sides are not mounted with the focus, track, and tilt coils, wires of the support units can easily be installed on the other opposite sides of the bobbin.

12 Claims, 6 Drawing Sheets

U.S. PATENT DOCUMENTS

| | | |
|---|---|---|
| 6,721,110 B2 | 4/2004 | Song et al. |
| 2003/0012090 A1 | 1/2003 | Kawano |

FOREIGN PATENT DOCUMENTS

| | | |
|---|---|---|
| JP | 10-116431 | 5/1998 |
| JP | 2000149292 | 5/2000 |
| JP | 2000-207757 | 7/2000 |

* cited by examiner

OPTICAL PICKUP ACTUATOR WITH A MAGNETIC DRIVER HAVING FOCUS, TRACK AND TILT COILS

CROSS-REFERENCE TO RELATED APPLICATIONS

This application is a Continuation of application Ser. No. 10/173,979 filed Jun. 19, 2002 now U.S. Pat. No. 7,210,154, the entire contents of which are incorporated by reference herein.

This application claims the benefit of Korean No. 2001-34686, filed Jun. 19, 2001, in the Korean Industrial Property Office, the disclosure of which is incorporated herein by reference.

BACKGROUND OF THE INVENTION

1. Field of the Invention

The present invention relates to an optical pickup actuator, and more particularly, to an optical pickup actuator having a bobbin having first opposite sides and second opposite sides, focus coils, track coils, and tilt coils disposed on the first opposite sides of the bobbin, to drive the bobbin in a focus direction, a track direction, and a tilt direction, and a support disposed on the second opposite sides of the bobbin to support the bobbin on the optical pickup actuator.

2. Description of the Related Art

In general, optical pickup actuators have been used in optical recording/reproducing devices and control an optical pickup to move in a non-contact way in a radial direction of a recording medium (disc) mounted on a turntable to record/reproduce data on/from the optical medium.

The optical pickup includes an objective lens condensing light emitted from a light source to form a light spot on the optical medium and an actuator controlling the objective lens in a track direction, a focus direction, and a tilt direction to accurately position the light spot on the optical medium.

The optical pickup actuator includes a 2-axis driving actuator driving the objective lens in the track and focus directions. However, as the number of numeral apertures of the objective lens increases for high density recording and a wavelength of a laser beam is reduced, a tilt margin of the optical pickup actuator decreases. To compensate for this, a 3-axis or 4-axis driving actuator driving in the tilt direction as well as the track and focus directions is required. The 3-axis driving actuator allows the objective lens to move in the focus, track, and tilt radial directions. The 4-axis actuator allows the objective lens to move in the focus, track, tilt radial, and tilt tangential directions. In FIG. 1, the focus, track, tilt radial, and tilt tangential directions are represented as L-L', M-M', N, and O, respectively.

Referring to FIG. 1, a conventional optical pickup actuator includes a base 100, a holder 103 fixed on the base 100, a bobbin 107 having an objective lens 105, wires 109 connecting the holder 103 to the bobbin 107, and a magnetic driver (not shown) driving the bobbin 107 in the track and focus directions or the tilt direction.

As shown in FIGS. 1, 2A and 2B, the magnetic driver includes focus coils 110 and tilt coils 112 both forming two pairs, track coils 115, first magnets 117, and second magnets 119. The focus coils 110 and the tilt coils 112 are disposed on first opposite sides 107a of the bobbin 107. The track coils 115 are disposed on second opposite sides 107b of the bobbin 107. The first magnets 117 and the second magnets 119 are installed on the base 100 to be spaced-apart from the focus coils 110, the tilt coils 112, and the track coils 115. Outer yokes 118 and 120 are installed on the base 100 and support corresponding ones of the first magnets 117 and the second magnets 119. Inner yokes 122 are installed on the base 100 to correspond to the first magnets 117 to guide the bobbin 107. The outer and inner yokes 118, 120, and 122 induce a magnetic field created by the first and second magnets 117 and 119 in a desired direction.

The wires 109 are soldered on two second opposite sides of the bobbin 107 and coupled to the holder 103 to electrically connect the magnetic driver to a circuit unit (not shown), which supplies current to the magnetic driver having the focus coils 110, the tilt coils 112, and the track coils 115.

FIG. 2A schematically shows a polarity of the first magnets 117 and directions of the current to observe a relationship of interaction forces between the focus and tilt coils 110 and 112, and the first magnets 117. Here, the focus coils 110 on two first opposite sides 107a of the bobbin 107 receive a focusing force $F_f$ according to Fleming's left-hand law so that the bobbin 107 moves in the focus direction L. The focus coils 110 receive an opposite focusing force in an opposite focus direction L' if the direction of the supplied current is changed.

The tilt coils 112 form pairs with the focus coils 110 on the first opposite sides 107a of the bobbin 107 to interact with the first magnets 117. Here, if the tilt coils 112 on the first opposite sides 107a of the bobbin 107 are supplied with the current having the same intensity and opposite direction as those of the focus coils 110, the tilt coils 112 receive one of tilting forces $F_{ti}$ with opposite directions. Thus, the bobbin 107 is driven in the tilt direction and particularly in the radial tilt direction N.

FIG. 2B schematically shows the polarity of the second magnets 117 and the directions of the current to observe the relationship of the interaction forces between the track coils 115 and the second magnets 117. The directions and magnitudes of the interaction forces between magnets and coils are determined based on Fleming's left-hand law. Thus, the track coils 115 on the second opposite sides 107b of the bobbin 107 receive a tracking force $F_t$ in the track direction due to the second magnets 119 so that the bobbin 107 moves in the track direction M. Here, if the direction of the supplied current is changed, the track coils 115 receive an opposite tracking force in the opposite track direction M'.

The wires 109 of the optical pickup actuator generally include six wires driving the bobbin 107 in the focus, track, and tilt directions. The 4-axis driving actuator may require more wires. However, since the optical pickup actuator is very small in size, there is not enough space to install the wires 109 on the bobbin 107 if the four first and second opposite sides 17a, 17b of the bobbin 107 are used to install the focus coils, track coils, and tilt coils. Also, if the number of wires 109 increases, it is difficult to adhere the wires to corresponding sides 17a, 17b of the bobbin 107 in such a narrow space. As a result, the poor adhesion of the wires 109 on the bobbin 107 increases.

Moreover, if the four first and second opposite sides 17a, 17b of the bobbin 107 are all used to be mounted with the focus, tilt, and track coils 110, 112, and 115, a connection between the focus, tilt, and track coils 110,112, and 115 becomes complicated. Also, since each of the focus, tilt, and track coils 110, 112, and 115 requires a magnet, the number of parts increases, and thus, productivity of the optical pick actuator decreases. Also, since the first magnets 117 for the focus coils 110 disposed on the first opposite sides of the bobbin 107 may interfere with a spindle motor (not shown) rotating the optical medium, the control of the spindle motor can be obstructed.

SUMMARY OF THE INVENTION

To solve the above and other problems, it is an object of the present invention to provide an optical pickup actuator having a bobbin having first opposite sides and second opposite sides, focus coils, track coils, and tilt coils disposed on the first opposite sides of the bobbin to drive the bobbin in a focus direction, a track direction, and a tilt direction, and a support disposed on the second opposite sides of the bobbin.

Additional objects and advantageous of the invention will be set forth in part in the description which follows and, in part, will be obvious from the description, or may be learned by practice of the invention.

To achieve the above and other objects, there is provided an optical pickup actuator including a base, a bobbin having first opposite sides and second opposite sides, a holder, and a magnetic driver. The bobbin is movably disposed on the base by supporting units disposed on the second opposite sides of the bobbin. The holder is disposed on one side of the base and connected to respective ends of the supporting units. The magnetic driver controls focus coils disposed on first opposite sides of the bobbin to drive the bobbin in a focus direction, track coils disposed on first opposite sides of the bobbin to drive the bobbin in a track direction, tilt coils disposed on the first opposite sides of the bobbin to drive the bobbin in a tilt direction, and magnets disposed on the base to face the focus coils, the track coils, and the tilt coils. Here, the focus coils, the track coils, and the tilt coils are disposed on the first opposite sides of the bobbin.

According to an aspect of the present invention, the magnets are four-polarization magnets.

According to another aspect of the present invention, the magnets are at least two-polarization magnets.

According to another aspect of the present invention, the focus coils and the tilt coils are common coils.

According to another aspect of the present invention, the focus coils and the tilt coils are separated coils.

According to still another aspect of the present invention, the focus coils, the tilt coils, or the track coils are fine pattern coils.

According to yet another aspect of the present invention, the focus coils and the tilt coils are disposed to overlap each other.

According to still yet another aspect of the present invention, the supporting units are disposed on the second opposite sides of the bobbin different from the first opposite sides of the bobbin on which the focus coils, the tilt coils, and the track coils are disposed.

According to further aspect of the present invention, the supporting units are wires or leaf springs.

According to also another aspect of the present invention, the optical pickup actuator further includes outer yokes on which the magnets are fixedly coupled, and inner yokes corresponding to the outer yokes.

BRIEF DESCRIPTION OF THE DRAWINGS

These and other objects and advantageous of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
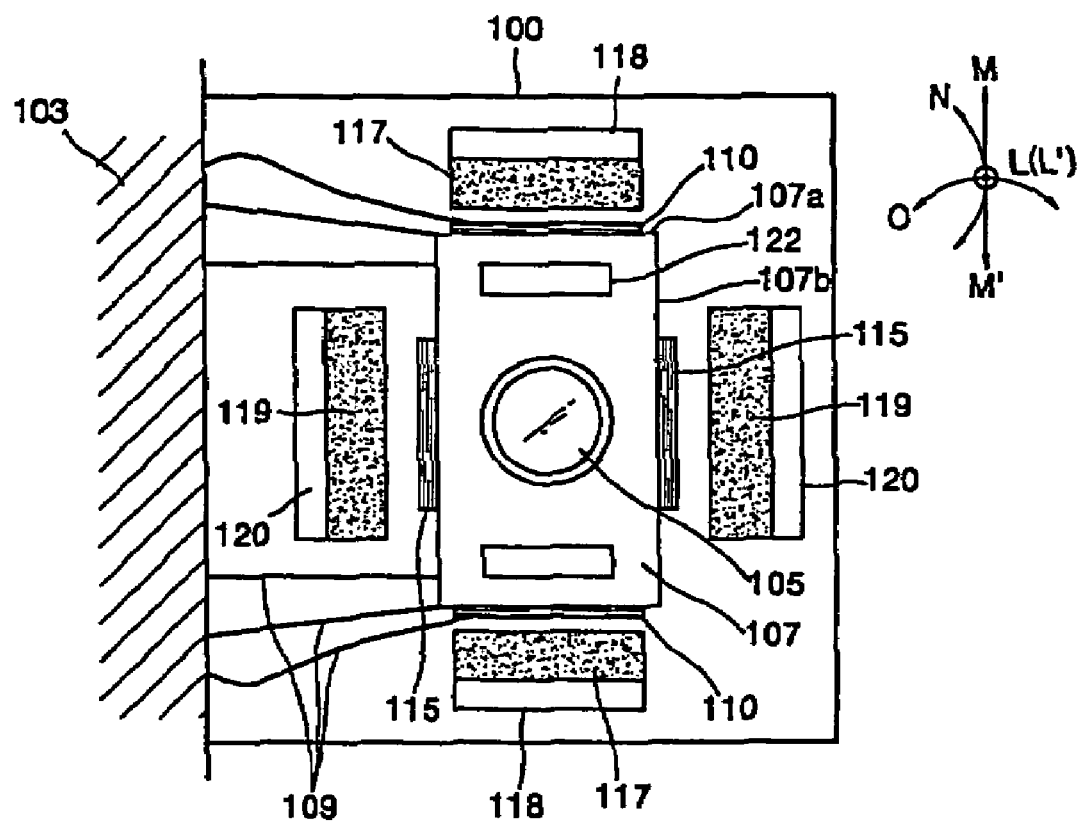
FIG. 1 is a plan view of a conventional optical pickup actuator.
Figure 2A:
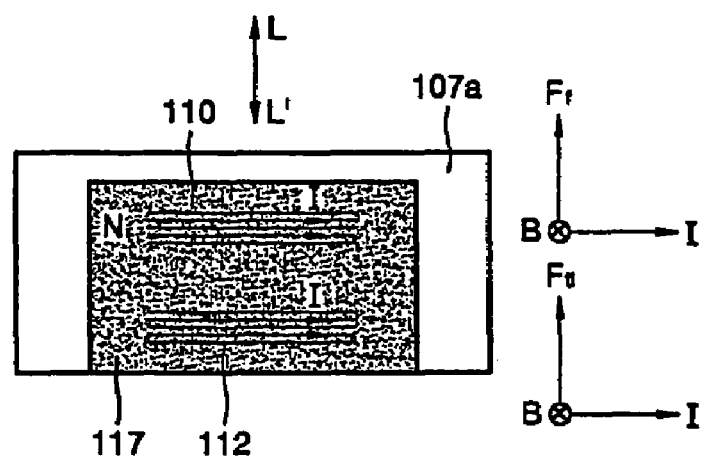
FIGS. 2A and 2B are diagrams showing a relationship between magnets and coils in the conventional optical pickup actuator shown in FIG. 1.
Figure 2B:
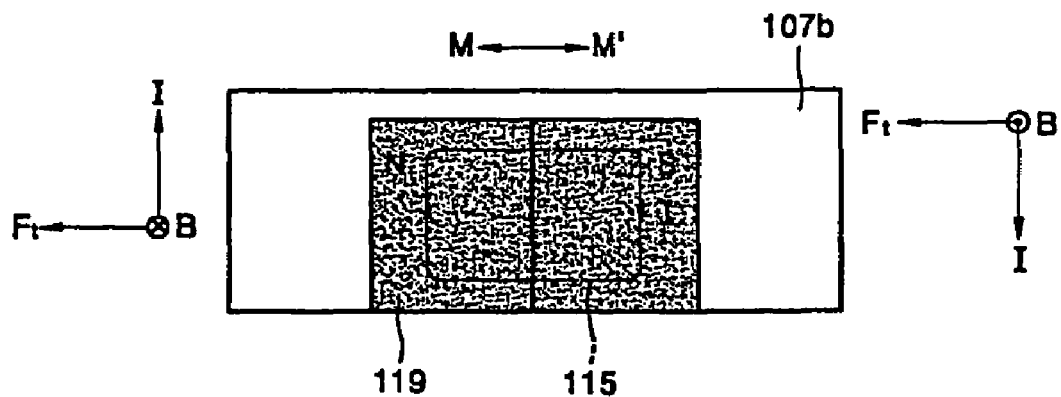

Reference will now be made in detail to the present preferred embodiments of the present invention, examples of which are illustrated in the accompanying drawings, wherein like reference numerals refer to the like elements throughout. The embodiments are described in order to explain the present invention by referring to the figures.

Figure 3:
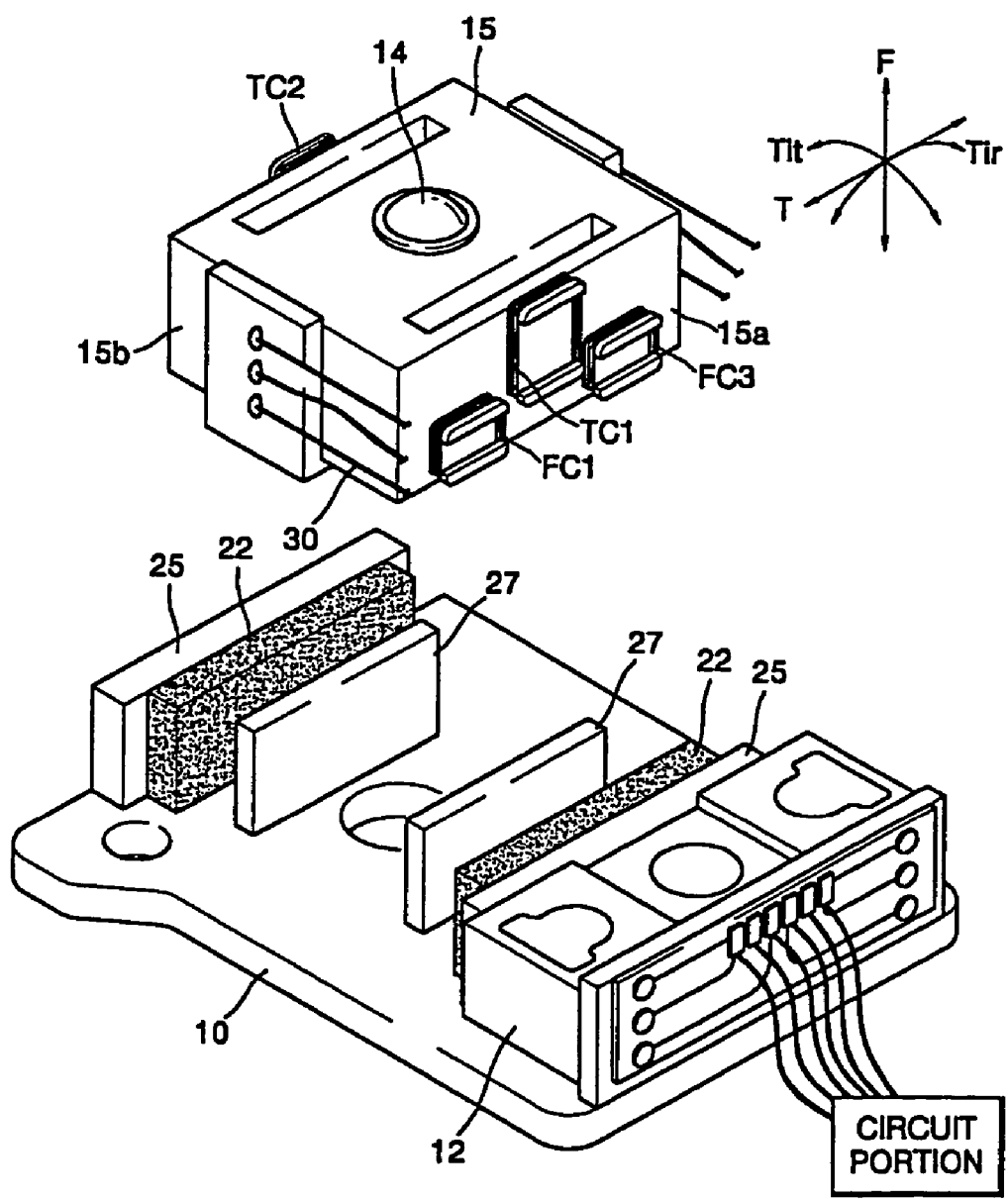
FIG. 3 is an exploded perspective view of an optical pickup actuator according to an embodiment of the present invention.
Figure 4:
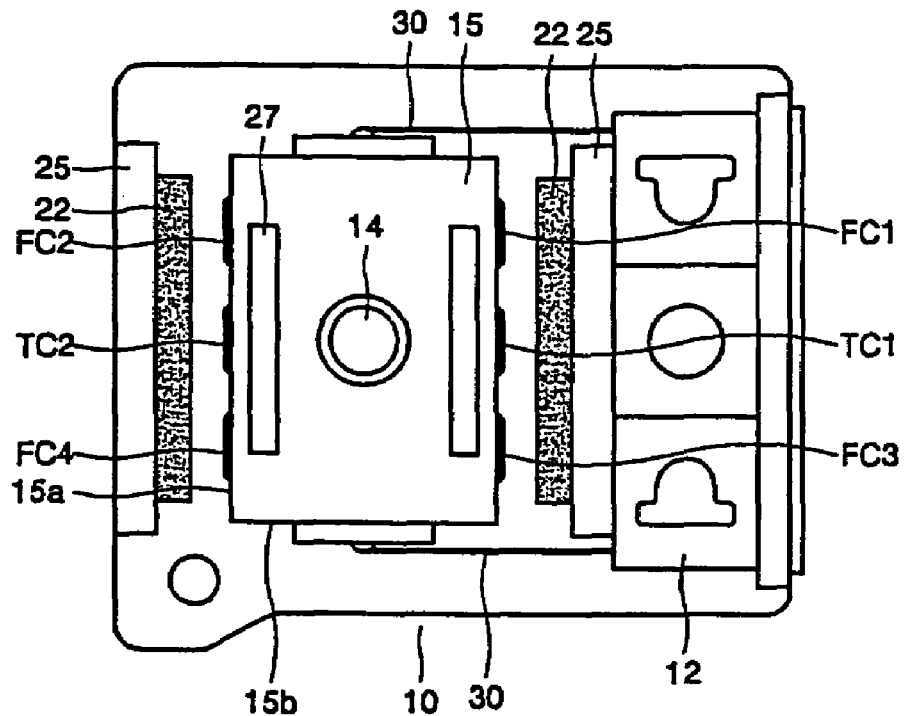
FIG. 4 is a plan view of the optical pickup actuator of FIG. 3.

Referring to FIGS. 3 and 4, an optical pickup actuator according to an embodiment of the present invention includes a base 10, a holder 12 disposed on one side of the base 10, a bobbin 15 with an objective lens 14, a magnetic driver driving the bobbin 15 in focus, tilt, and track directions.

The magnetic driver includes at least one focus coil driving the bobbin 15 in the focus direction, at least one track coil driving the bobbin 15 in the track direction, at least one tilt coil driving the bobbin 15 in the tilt direction, and magnets 22 disposed on the base 10 to face the focus, track, and tilt coils.

For example, at least one focus coil may includes first, second, third, and fourth focus coils, i.e., FC1, FC2, FC3, and FC4, respectively, and at least one track coil may includes first and second track coils, i.e., TC1 and TC2, respectively. Here, the first, second, third, and fourth focus coils FC1, FC2, FC3, and FC4 control the bobbin to move in the focus and tilt directions. That is, the first, second, third, and fourth focus coils FC1, FC2, FC3, and FC4 may have both a focusing error correction function and a tilting error correction function.

The magnets 22 face the first, second, third, and fourth focus coils, FC1, FC2, FC3, and FC4, and the first and second track coils, TC1 and TC2. Here, the first, second, third, and fourth coils FC1, FC2, FC3, and FC4, and the first and second track coils TC1 and TC2 are all disposed on first opposite sides 15a of the bobbin 15. Supporting units 30, which supply current to the first, second, third, and fourth coils FC1, FC2, FC3, and FC4 and the first and second track coils TC1 and TC2, are disposed on second opposite sides 15b of the bobbin 15. The supporting units 30 may be wires or plate springs.

The supporting units 30 are connected between the holder 12 and corresponding ones of supports 30a which are disposed on the second opposite sides 15b of the bobbin 15. The supporting units 30 are also connected to a circuit portion which controls each of the first, second, third, and fourth focus coils FC1, FC2, FC3, and FC4, and the first and second track coils TC1 and TC2 through corresponding ones of the supporting units 30.

The track coil TC1 and the focus coils FC1 and FC3 are disposed on one of the first opposite sides 15a of the bobbin 15 to face one of the magnets 22, and the track coil TC2 and the focus coils FC2 and FC4 are disposed on the other one of the first opposite sides 15a of the bobbin to face the other one of the magnets 22.

Figure 5:
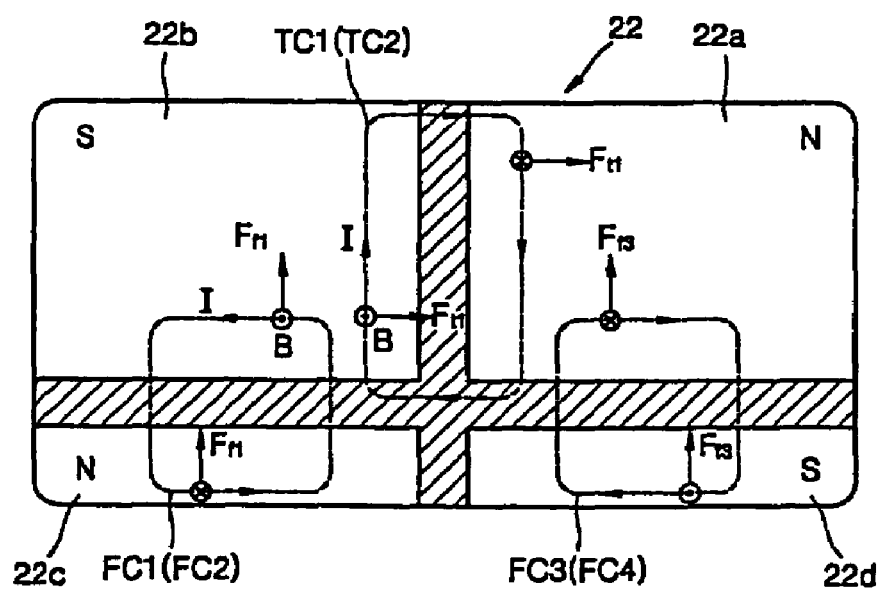
FIG. 5 is a diagram showing a relationship of between magnets and coils in the optical pickup actuator of FIG. 3.

Each magnet 22 has four polarizations as shown in FIG. 5. As an example, the magnet 22 is divided into first, second, third, and fourth polarizations 22a, 22b, 22c, and 22d. The first polarization 22a is an N pole, the second polarization 22b is an S pole, the third polarization 22c is the N pole, and the fourth polarization 22 is the S pole. The first, second, third, and fourth focus coils FC1, FC2, FC3, and FC4, and the first and second track coils TC1 and TC2 are disposed to face corresponding ones of the first, second, third, and fourth polarizations 22a, 22b, 22c, and 22d, respectively.

For example, the first and second track coils TC1 and TC2 are disposed to face the first and second polarizations 22a and 22b. The first, second, third, and fourth focus coils FC1, FC2, FC3, and FC4 are divided into two pairs each including one of the track coils TC1 and TC2. For example, a first pair includes two of the first, second, third, and fourth focus coils FC1, FC2, FC3, and FC4 and one of the track coils TC1, TC2, and a second pair includes the other two of the first, second, third, and fourth focus coils FC1, FC2, FC3, and FC4 and the other one of the track coils TC1, TC2. Each pair is disposed on one of the first opposite sides 15a of the bobbin 15. In other words, the first and second focus coils FC1 and FC2, may be disposed to face portions of the second and third polarizations 22b and 22c, and the third and fourth focus coils FC3 and FC4, may be disposed to face portions of the first and fourth polarizations 22a and 22d.

The magnet 22 may also be a two-polarization magnet. For example, two-polarization magnets 22 may be spaced-apart from each other to face corresponding one of two pairs of the first, second, third, and fourth focus coils FC1, FC2, FC3, and FC4.

Figure 6:
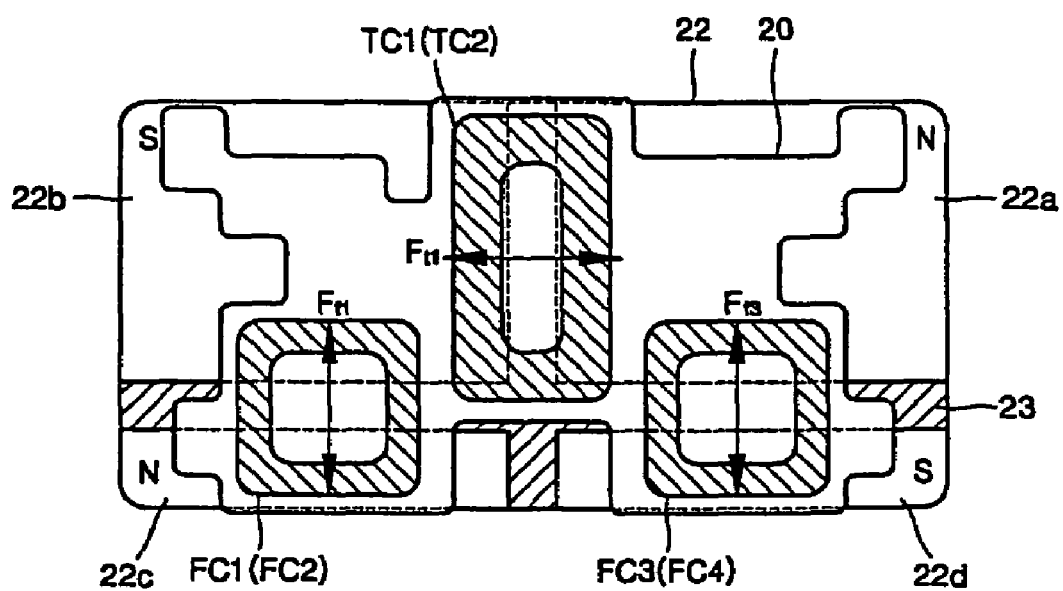
FIG. 6 is a diagram showing interaction forces between the magnets and fine pattern coils in the optical pickup actuator of FIG. 3.

Here, the first, second, third, and fourth focus coils FC1, FC2, FC3, and FC4, and the first and second track coils TC1 and TC2, may be winding coils. Also, as shown in FIG. 6, at least one of the focus, tilt, and track coils may be a fine pattern coil 20. The fine pattern coil 20 is manufactured by patterning a coil on a film and is very useful to be installed in a narrow space.

Figure 7:
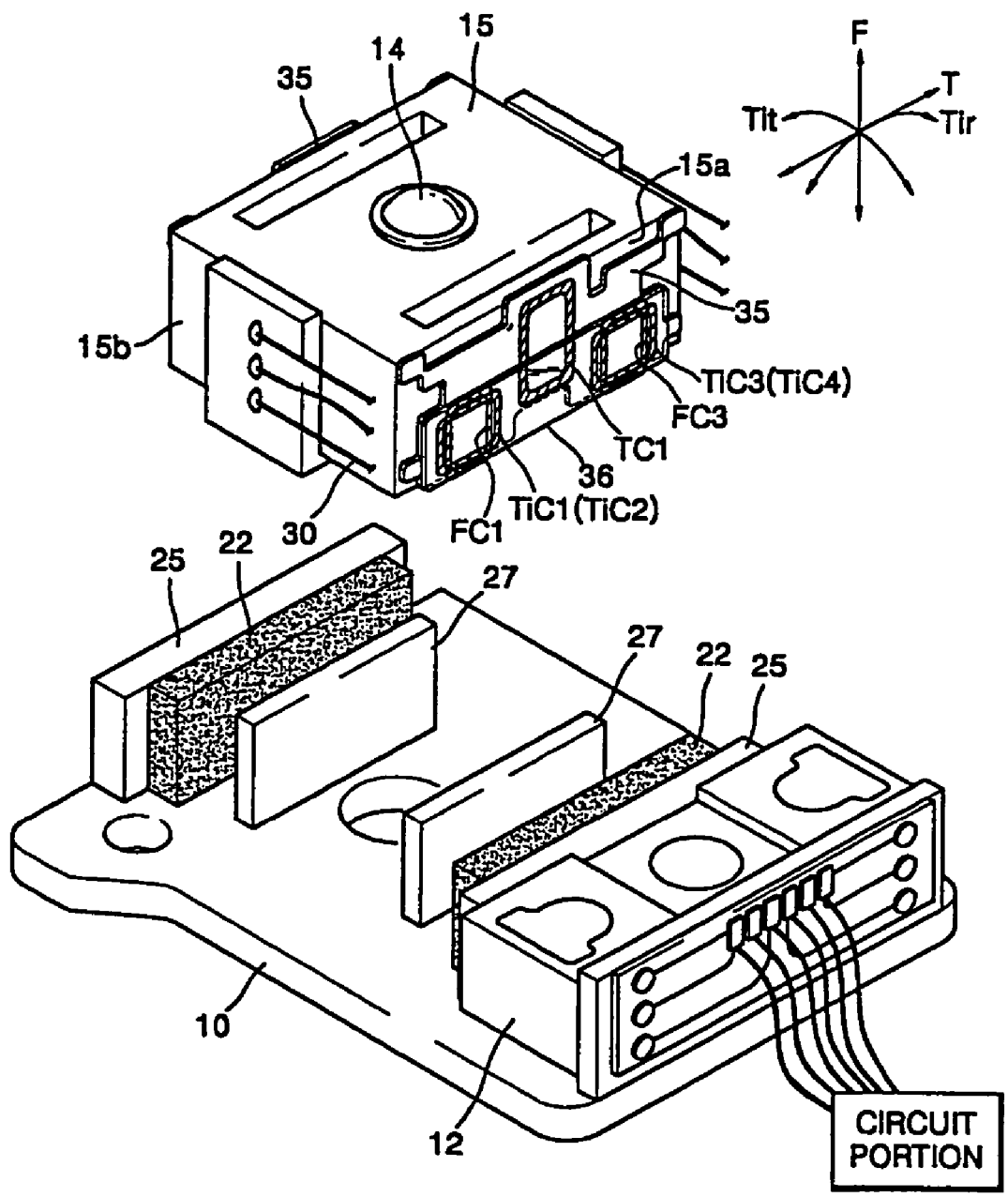
FIG. 7 is an exploded perspective view of another optical pickup actuator according to another embodiment of the present invention.

In the above-described embodiment of FIGS. 3-6, the tilt coils are included in corresponding ones of the first, second, third, and fourth focus coils, FC1, FC2, FC3, and FC4. In other words, one coil controls the driving in both the focus and tilt directions. However, in another embodiment of the present invention as shown in FIG. 7, tilt coils may be separately provided from the first, second, third, and fourth focus coils FC1, FC2, FC3, and FC4. In FIG. 7, the first, second, third, and fourth tilt coils TiC1, TiC2, TiC3, and TiC4 are disposed to overlap each of the first, second, third, and fourth focus coils FC1, FC2, FC3, and FC4. Here, the coils are made in a form of first and second fine pattern coils 35 and 36.

As described above, any type of a magnet having the four polarizations 22a, 22b, 22c, and 22d may be used as the magnet 22. The first and second focus coils FC1 and FC2 are disposed over the second and third polarizations 22b and 22c to face each other, and the third and fourth focus coils FC3 and FC4 are placed over the first and fourth polarizations 22a and 22d to face each other. The second fine pattern coils 36, which are formed by patterning the tilt coils TiC1, TiC2, TiC3, and TiC4 on a corresponding film, may be disposed in front of or behind the first fine pattern coils 35, which are also formed by patterning the first and third focus coils FC1 and FC3, and one of the first track coils TC1, TC2 on a corresponding film. Each of two pairs of the tilt coils TiC1, TiC2, TiC3, and TiC4 may be disposed on the first opposite sides 15a of the bobbin 15. In FIG. 7, only the first and third tilt coils TiC1 and TiC3 are shown on one of the first opposite sides 15a. However, the second and fourth tilt coils TiC2 and TiC4 are disposed on the other one of the first opposite sides 15a.

The four polarizations 22a, 22b, 22c, and 22d of the magnet 22 may have the same area. However, the first and second polarizations 22a and 22b, which are disposed to face the first and second track coils TC1 and TC2, may have wider areas than the third and fourth polarizations 22c and 22d in order to provide wider effective areas to the first and second track coils TC1 and TC2. In other words, the first, second, third, and fourth focus coils FC1, FC2, FC3, and FC4, and the first, second, third, and fourth tilt coils TiC1, TiC2, TiC3, and TiC4 use the first, second, third, and fourth polarizations 22a, 22b, 22c, and 22d. However, the first and second track coils TC1 and TC2 use only the first and second polarizations 22a and 22b. Thus, the areas of the first, second, third, and fourth polarizations 22a, 22b, 22c, and 22d can be controlled to be equally divided with respect to the first, second, third, and fourth focus coils FC1, FC2, FC3, and FC4, and the first, second, third, and fourth tilt coils TiC1, TiC2, TiC3, and TiC4, and the first and second track coils TC1 and TC2.

A neutral region 23 may be formed between the first, second, third, and fourth polarizations 22a, 22b, 22c, and 22d of the magnet 22 as shown in FIGS. 5 and 6. The neutral region 23 is disposed at boundaries of the polarizations 22a, 22b, 22c, and 22d to prevent a magnetic force from being weakened due to offsets at contact points between different polarities. If the magnet 22 has two regions having different polarizations, the neutral region 23 may be formed between the two regions to prevent interference between the different polarizations.

Outer yokes 25 and inner yokes 27 may be further included to induce a desired distribution of the magnetic force generated by the magnet 22.

An operation of the optical pickup actuator having the above-described configuration will be described below.

First, a case where the focus coils FC1, FC2, FC3, and FC4 are shared with the tilt coils to perform the focusing error correction function and the tilting error correction function will be described. The focusing error correction function in a focus direction F and the tilting error correction function in a tilt direction T are performed due to an interaction (the magnetic force) between the first, second, third, and fourth focus coils FC1, FC2, FC3, and FC4, and the magnet 22.

A driving direction is determined based on a current direction of the supplied current to the first, second, third, and fourth focus coils FC1, FC2, FC3, and FC4. One method is to supply the current from the same power source to the first and second focus coils FC1 and FC2, and to supply the current from another power source to the third and fourth focus coils FC3 and FC4. Another method is to supply the currents from four different power sources to the first, second, third, and fourth focus coils FC1, FC2, FC3, and FC4, respectively.

In the former method, the first, second, third, and fourth focus coils FC1, FC2, FC3, and FC4 receive the magnetic forces in the same directions, which are directed upward or downward, respectively, due to the interaction with the magnetic field of the magnet 22 if the currents having the same current directions are applied to the first and second focus coils, FC1 and FC2, and the third and fourth focus coils, FC3 and FC4, respectively. Thus, the bobbin 15 is driven in the focus direction F. In the later method, the first, second, third, and fourth focus coils FC1, FC2, FC3, and FC4 receive the magnetic forces in different directions, which are directed upward or downward on the left and right sides of the bobbin 15 if the current is supplied to the first and second focus coils FC1 and FC2 in the same direction, and the current is supplied to the third and fourth focus coils FC3 and FC4 in a different direction from the first and second focus coils FC1 and FC2. Thus, the bobbin 15 is driven in the tilt direction. With this configuration, it is possible to drive the bobbin 15 by performing a 3-axis driving function in the focus direction F, the track direction T, and tilt radial direction Tir as shown in FIGS. 3-6.

When the current is supplied from the same power source to the first and third focus coils FC1 and FC3, and when the current is supplied from another power source to the second and fourth focus coils FC2 and FC4, the bobbin 15 is driven in a tilt tangential direction Tit.

The bobbin 15 moves upward and downward in the focus direction F when the currents are supplied from four different power sources to the first, second, third, and fourth focus coils FC1, FC2, FC3, and FC4 in the same direction, respectively.

The bobbin 15 is driven in the tilt radial direction Tir if the current is supplied from the same power source to the first and second focus coils FC1 and FC2, respectively, in the same direction, and if the current is supplied from another power source to the third and fourth focus coils FC3 and FC4, respectively, in a different direction from the first and second focus coils FC1 and FC2. If the current is supplied from the same power source to the first and third focus coils FC1 and FC3, respectively, in the same direction, and if the current is supplied from another power source to the second and fourth focus coils FC2 and FC4, respectively, in a different direction, the bobbin 15 is driven in the tilt tangential direction Tit.

The first and second track coils TC1 and TC2 interact with the first and second polarizations 22a and 22b to move the bobbin 15 in the track direction T. Thus, it is possible that a 4-axis driving function is performed to drive the bobbin 15 in the focus direction F, the track direction T, the tilt radial direction Tir, and the tilt tangential direction Tit as shown in FIGS. 3-6.

As shown in FIG. 7, the relationship between coils and magnets will be described when the first, second, third, and fourth focus coils FC1, FC2, FC3, and FC4, and the first, second, third, and fourth tilt coils TiC1, TiC2, TiC3, and TiC4 are formed in the corresponding films which are disposed on the first opposite sides 15a of the bobbin 15.

The current may also be supplied from the same power source to the first, second, third, and fourth focus coils FC1, FC2, FC3, and FC4, respectively. In this case, the bobbin 15 may be driven upward or downward according only to the current directions of the current. The operation of the first and second track coils TC1 and TC2 is the same as described previously and thus will be omitted.

The currents can also be supplied from the four different power sources to the first, second, third, and fourth tilt coils TiC1, TiC2, TiC3, and TiC4 so that the bobbin 15 is driven in the tilt radial direction Tir and the tilt tangential direction Tit. In other words, if the current is supplied from the same power source to the first and second tilt coils TiC1 and TiC2, and if the current is supplied from the different power source to the first and second tilt coils TiC1 and TiC2 and to the third and fourth tilt coils TiC3 and TiC4, the bobbin 15 is driven in the tilt radial direction Tir. If the current is supplied from the same power source to the first and third tilt coils TiC1 and TiC3, and if the current is supplied from the different power sources to the first and third tilt coils TiC1 and TiC3, and to the second and fourth tilt coils TiC2 and TiC4, the bobbin 15 is driven in the tilt tangential direction Tit.

The arrangement of the polarizations of the magnets and coils was described as only an example and may be modified in various forms without departing from the spirit and scope of the invention.

As described above, an optical pickup actuator according to the present invention has focus coils, track coils, and tilt coils on first opposite sides of a bobbin to leave second opposite sides of the bobbin to be empty sides on which the focus, track, and tilt coils are not disposed. Wires can easily be installed on the second opposite sides of the bobbin, a poor adhesion of the wires to the bobbin can be reduced, and thus 3-axis and 4-axis drives can safely be implemented and performed in the optical pick actuator.

Although a few preferred embodiments of the present invention have been shown and described, it would be appreciated by those skilled in the art that changes may be made in this embodiment without departing from the principles and sprit of the invention, the scope of which is defined in the claims and their equivalents.

What is claimed is:

1. An optical recording and/or reproducing apparatus for use with transferring information with respect to a recording medium, comprising:
    a spindle motor rotating the recording medium;
    an optical pickup including an objective lens and an actuator which actuates the objective lens so as to transfer the information with respect to the recording medium; and
    a control unit driving the spindle motor and optical pickup to transfer the information with respect to the recording medium and controlling the actuator of the optical pickup in the radial, track, tilt and focusing directions,
    wherein the optical actuator comprises:
    a base;
    a bobbin movably disposed on the base, the bobbin having a first pair of opposite sides and a second pair of opposite sides;
    supporting units movably coupling the bobbin to the base;
    a holder disposed on the base and connected to one end of the supporting unit; and
    a magnetic driver having focus coils driving the bobbin in a focus direction, track coils driving the bobbin in a track direction, tilt coils driving the bobbin in a tilt direction, and magnets installed to face the focus coils, the track coils, and the tilt coils;
    wherein the focus coils, the track coils and the tilt coils are disposed on only one of the first and second pairs of the opposite sides of the bobbin and the focus coils and the tilt coils are arranged so as not to overlap the track coils.

2. An optical recording and/or reproducing apparatus of claim 1, wherein the magnets are four-polarization magnets.

3. An optical recording and/or reproducing apparatus of claim 2, wherein the focus coils and the tilt coils are common coils.

4. An optical recording and/or reproducing apparatus of claim 2, further comprising outer yokes on which the magnets are fixed, and inner yokes corresponding to the outer yokes.

5. An optical recording and/or reproducing apparatus of claim 2, wherein the bobbin comprises an objective lens mounted in the bobbin.

6. An optical recording and/or reproducing apparatus of claim 1, wherein at least one of the focus coils, the tilt coils, and the track coils is a fine pattern coil.

7. An optical recording and/or reproducing apparatus of claim 1, wherein the supporting units are disposed on the other one of the first and second pairs of the opposite sides of the bobbin other than the one pair on which the focus coils, the tilt coils, and the track coils are disposed.

8. An optical recording and/or reproducing apparatus for use with transferring information with respect to a recording medium, comprising:
    a spindle motor rotating the recording medium;

an optical pickup including an objective lens and an actuator which actuates the objective lens so as to transfer the information with respect to the recording medium; and a control unit driving the spindle motor and optical pickup to transfer the information with respect to the recording medium and controlling the actuator of the optical pickup in the radial, track, tilt and focusing directions, wherein the optical actuator comprises:

a base;

a bobbin having first opposite sides and second opposite sides;

driving coils each having two focus coils, a track coil, and two tilt coils, the driving coils being disposed on corresponding sides of the first opposite sides of the bobbin;

support units coupled between the base and corresponding sides of the second opposite sides of the bobbin; and magnets disposed to face corresponding ones of the driving coils of the first opposite sides of the bobbin, wherein, for each of the driving coils, the two focus coils and two tilt coils are arranged so as not to overlap the track coils.

9. An optical recording and/or reproducing apparatus of claim 8, wherein each of the two focus coils and corresponding ones of the two tilt coils in each driving coil are formed in a common coil controlling the bobbin to move both a focus direction and a tilt direction.

10. An optical recording and/or reproducing apparatus of claim 8, wherein the first opposite sides are parallel to each other.

11. An optical recording and/or reproducing apparatus of claim 8, wherein the second opposite sides are parallel to each other.

12. An optical recording and/or reproducing apparatus of claim 8, wherein each of the two focus coils, the track coil, and the two tilt coils in each driving coil are formed in a fine pattern coil.

* * * * *